United States Patent
Kawatsu

(10) Patent No.: US 11,902,474 B2
(45) Date of Patent: Feb. 13, 2024

(54) IMAGE READING AND FORMING APPARATUS WITH SWITCHABLE BACKGROUND FOR IMAGE SENSOR AND COLORIMETER

(71) Applicant: Konica Minolta, Inc., Tokyo (JP)

(72) Inventor: Kenji Kawatsu, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/731,865

(22) Filed: Apr. 28, 2022

(65) Prior Publication Data

US 2022/0353382 A1 Nov. 3, 2022

(30) Foreign Application Priority Data

Apr. 30, 2021 (JP) ................. 2021-077343

(51) Int. Cl.
*H04N 1/00* (2006.01)

(52) U.S. Cl.
CPC ..... *H04N 1/00023* (2013.01); *H04N 1/00034* (2013.01); *H04N 1/00063* (2013.01); *H04N 1/00087* (2013.01); *H04N 1/00806* (2013.01)

(58) Field of Classification Search
CPC .......... H04N 1/00013; H04N 1/00015; H04N 1/00023; H04N 1/00034; H04N 1/00063; H04N 1/00087; H04N 1/60; H04N 1/6044; H04N 1/00806; H04N 1/0657; H04N 1/48
See application file for complete search history.

(56) References Cited

U.S. PATENT DOCUMENTS

| | | | |
|---|---|---|---|
| 10,440,204 B2* | 10/2019 | Kawatsu | H04N 1/00557 |
| 10,594,876 B2* | 3/2020 | Xu | H04N 1/00045 |
| 2012/0194588 A1 | 8/2012 | Kasai | |
| 2015/0350493 A1 | 12/2015 | Sakatani | |
| 2019/0387126 A1 | 12/2019 | Shiraki | |
| 2022/0179349 A1* | 6/2022 | Nomura | G03G 15/5041 |
| 2022/0350286 A1* | 11/2022 | Kawatsu | G03G 15/657 |
| 2022/0360677 A1* | 11/2022 | Kawatsu | H04N 1/6033 |
| 2023/0007142 A1* | 1/2023 | Nomura | H04N 1/00352 |

FOREIGN PATENT DOCUMENTS

| | | | |
|---|---|---|---|
| JP | 2011073307 A | | 4/2011 |
| JP | 2016191779 A | * | 11/2016 |
| JP | 2019080327 A | * | 5/2019 |
| JP | 2019201280 A | * | 11/2019 |

OTHER PUBLICATIONS

European search opinion. (Year: 2009).*
EPO Extended European Search Report for corresponding EP Application No. 22168988.8; dated Sep. 26, 2022.

* cited by examiner

*Primary Examiner* — Scott A Rogers
(74) *Attorney, Agent, or Firm* — CANTOR COLBURN LLP

(57) ABSTRACT

An image reading apparatus includes: a reader that reads an image formed on a print medium; and a backing part that is disposed at a position facing the reader and is capable of switching a color of a portion to be a background of the print medium upon reading by the reader to a plurality of colors according to a type of the print medium and/or a color read from the print medium.

11 Claims, 4 Drawing Sheets

IMAGE READING AND FORMING APPARATUS WITH SWITCHABLE BACKGROUND FOR IMAGE SENSOR AND COLORIMETER

CROSS REFERENCE TO PRIOR APPLICATIONS

The present invention claims priority under 35 U.S.C. § 119 to Japanese patent Application No. 2021-077343, filed on Apr. 30, 2021, the entire content of which is incorporated herein by reference.

BACKGROUND

Technological Field

The present invention relates to an image reading apparatus and an image forming apparatus, and more particularly to a technique applied to a configuration provided with an image sensor or a colorimeter for reading an image.

Description of the Related Art

When an image is printed on a print medium such as paper or a film with an image forming apparatus, the image printed on the print medium is read by a scanner or the like, and the read image data is compared with print original data to inspect whether or not printing has been properly performed.

As such an inspection, for example, the entire printed image is read by a scanner to determine whether or not the printed image is contaminated or whether or not an amount of deposited ink is appropriate. When the inspection is performed using the scanner, the color of the printed image is at least partially measured by a colorimeter, and the color of the data read by the scanner is calibrated on the basis of the color measured by the colorimeter, in order to correctly inspect the color of the image read by the scanner.

JP 2011-73307 A describes a technique of calibrating a plurality of printers, the technique including manually performing color measurement in a white background and color measurement in a black background when acquiring an amount of ink to be deposited on a transparent print medium by each of the printers.

An image reading apparatus that performs reading with a scanner and color measurement with a colorimeter often reads an image printed on a white print medium. An area where the scanner and the colorimeter are disposed usually has a white background. Due to the white background, an image printed on a white print medium can be appropriately read and the color measurement thereof can be appropriately performed.

Meanwhile, when reading an image printed on a transparent film or measuring the color thereof in a white background, the image reading apparatus may fail to properly read the image or measure the color of the image.

For example, when an image is printed on a transparent film, so-called white underlay printing may be used for printing. The technique of white underlay printing means that white color is applied on a portion of a film where an image is to be printed, and images of respective colors are formed on the white color. This technique enables great color development of the image.

When the portion where white color is applied is read in a white background, it is impossible to distinguish the white color on a print surface from the white color in the background, entailing a problem that appropriate reading for inspection cannot be performed.

Here, JP 2011-73307 A describes a technique of manually switching the color measurement in a white background and the color measurement in a black background. When inspection is carried out for each background color, appropriate inspection can be achieved. However, in a printing process in an actual printing apparatus, it is necessary to enhance productivity by continuously printing a large number of images in both the cases of using a cut sheet and roll paper as a print medium. Therefore, manually switching the color measurement in a white background and the color measurement in a black background one by one takes a lot of time and effort for inspection, and a sheet on which an image is printed by an image forming apparatus cannot be inspected in real time. Thus, the productivity in the printing process is lowered.

Note that, although the problem pertaining to the case of inspecting an image printed on a transparent film has been described here, a white background may not be appropriate also in the case of inspecting an image printed on a sheet with a color other than white.

SUMMARY

An object of the present invention is to provide an image reading apparatus and an image forming apparatus capable of appropriately reading both an image printed on a white print medium and an image printed on a print medium having a color other than white.

To achieve the abovementioned object, according to an aspect of the present invention, an image reading apparatus reflecting one aspect of the present invention comprises: a reader that reads an image formed on a print medium; and a backing part that is disposed at a position facing the reader and is capable of switching a color of a portion to be a background of the print medium upon reading by the reader to a plurality of colors according to a type of the print medium and/or a color read from the print medium.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention (hereinafter referred to as "present embodiment")

will be described in sequence with reference to the drawings. However, the scope of the invention is not limited to the disclosed embodiments.

[Overall Configuration]

Figure 1:
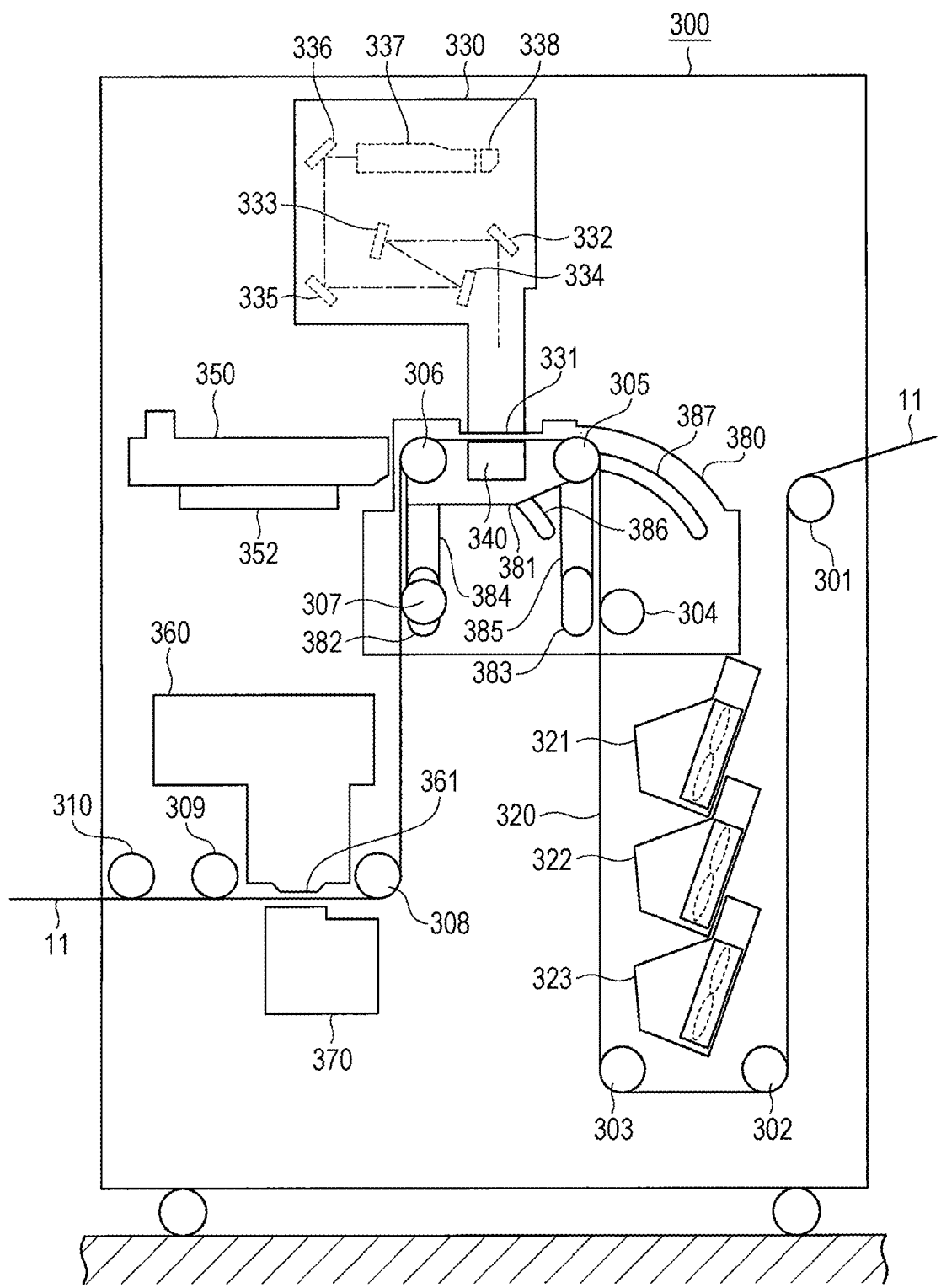
FIG. 1 is a diagram illustrating a configuration of an image reading apparatus according to an embodiment of the present invention.
Figure 2:
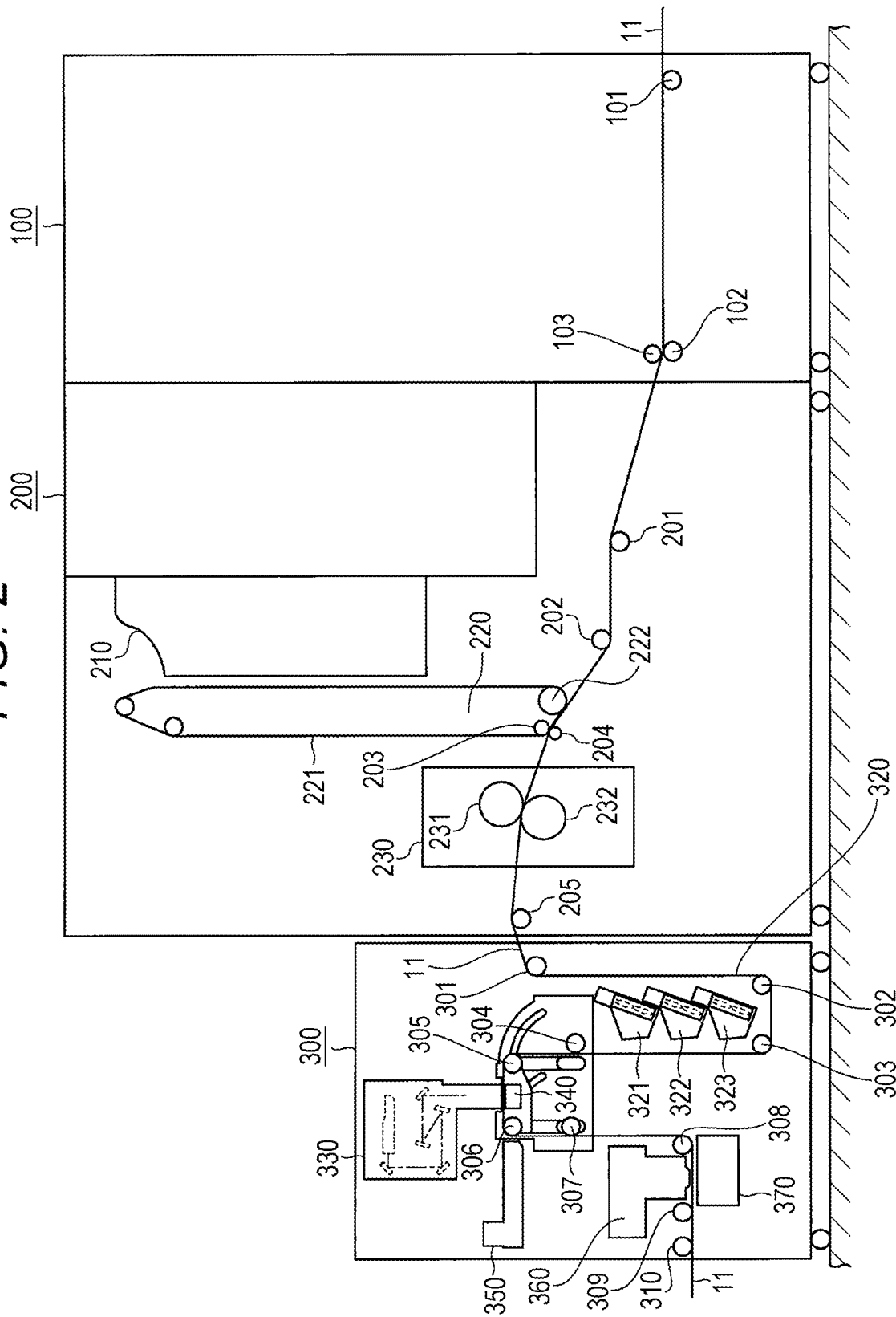
FIG. 2 is a diagram illustrating an example of an entire configuration of an image forming apparatus to which the image reading apparatus according to the embodiment of the present invention is connected.

FIG. 1 illustrates a configuration of an image reading apparatus according to the present embodiment, and FIG. 2 illustrates an overall configuration as an image forming apparatus to which the image reading apparatus according to the present embodiment is connected. FIGS. 1 and 2 illustrate internal configurations of the respective apparatuses on a conveyance path of a print medium on which an image is to be formed.

First, prior to describing an image reading apparatus 300 illustrated in FIG. 1, the entire configuration connected to the image forming apparatus will be described with reference to FIG. 2.

In the example illustrated in FIG. 2, a sheet feeder 100, the image forming apparatus 200, and the image reading apparatus 300 are connected in order from the right side. Note that, although the entire system including the sheet feeder 100 and the image reading apparatus 300 which are connected to the image forming apparatus 200 as illustrated in FIG. 2 can also be regarded as an image forming apparatus, a single apparatus that performs an image forming process is regarded as the image forming apparatus 200 in the following description. In addition, a continuous print medium 11, which is a long print medium that can be mounted on the image forming apparatus 200 according to the present embodiment, can be a sheet or film medium having various colors other than white as well as a white sheet or film medium. Further, the continuous print medium 11 can be a transparent or semitransparent film.

The continuous print medium 11, which is a continuous print medium fed out from a supply roll (not illustrated), is supplied to the sheet feeder 100, and a plurality of rollers 101 to 103 is disposed on a conveyance path of the continuous print medium 11. Then, the sheet feeder 100 performs a process of feeding the continuous print medium 11 to the image forming apparatus 200 at a predetermined speed.

The image forming apparatus 200 includes a toner image forming unit 210, a transfer unit 220, and a fixing unit 230 as a processing unit constituting an image former. The toner image forming unit 210 forms toner images of respective colors such as yellow Y, magenta M, cyan C, black K, and white W, on a transfer belt 221 of the transfer unit 220.

The transfer unit 220 transfers toner images of respective colors formed on the transfer belt 221 to the surface of the continuous print medium 11 with a transfer roller 222.

The fixing unit 230 including fixing rollers 231 and 232 heats the continuous print medium 11 passing between the fixing rollers 231 and 232 to fix a printed image, which is the transferred image, to the continuous print medium 11. The fixing unit 230 heats the continuous print medium 11 to, for example, about 100° C.

The image forming apparatus 200 includes a plurality of rollers 201 to 205 in addition to the transfer roller 222 and the fixing rollers 231 and 232 in the middle of the conveyance path of the continuous print medium 11. Note that, on the downstream side of the conveyance path with respect to the fixing unit 230 in the conveyance direction, only the roller 205 that is in contact with the back surface (surface opposite to the surface on which the printed image is formed) of the continuous print medium 11 is disposed, and the front surface of the continuous print medium 11 does not contact any roller. The rollers 201 to 205 are metallic, for example. In the following description, the wordings "down-stream side" and "upstream side" mean the downstream side and the upstream side as viewed in the conveyance direction of the continuous print medium 11.

The continuous print medium 11 on which the printed image has been formed by the image forming apparatus 200 is sent to the image reading apparatus 300 described below.

[Configuration of Image Reading Apparatus]

Next, a configuration of the image reading apparatus 300 will be described with reference to FIG. 1.

The image reading apparatus 300 includes a cooling unit 320, a scanner unit 330, a shading unit 350, and a colorimeter unit 360. The continuous print medium 11 passes through these units in sequence.

The scanner unit 330 includes a scanner backing part 340, and the colorimeter unit 360 includes a colorimeter backing part 370.

In addition, a plurality of rollers 301 to 310 is disposed in the conveyance path of the continuous print medium 11 in the image reading apparatus 300. The rollers 301 to 310 are metallic, for example.

The continuous print medium 11 conveyed to the inside of the image reading apparatus 300 passes near the cooling unit 320. A plurality of cooling fans 321 to 323 is disposed in the cooling unit 320 to cool the continuous print medium 11. In FIG. 1, the continuous print medium 11 is vertically conveyed from top to bottom, and the conveyed continuous print medium 11 is cooled by three cooling fans 321 to 323 arranged vertically. As the cooling fans 321 to 323, a fan called a sirocco fan having a plate-shaped blade attached to a rotating cylinder is used, for example. Alternatively, a fan including a propeller may be used as the cooling fans 321 to 323.

The continuous print medium 11 is heated to about 100° C. by the fixing unit 230 of the image forming apparatus 200 as described with reference to FIG. 2, and thus, the continuous print medium 11 has a high temperature of, for example, about 70° C. at the time of being supplied to the image reading apparatus 300. Therefore, the cooling fans 321 to 323 supply cooling air to the continuous print medium 11 to cool the continuous print medium 11 to about room temperature.

The cooling unit 320 of the image reading apparatus 300 needs to have sufficient cooling performance by arranging a plurality of (three) cooling fans 321 to 323 in the conveyance direction. In such a case, the conveyance path of the continuous print medium 11 is vertically formed and the cooling fans 321 to 323 are vertically (longitudinally) arranged as illustrated in FIG. 1. This configuration can contribute to downsizing of the image reading apparatus 300. That is, when the conveyance path is horizontally formed and the plurality of cooling fans is arranged in the horizontal direction, the image reading apparatus 300 is accordingly increased in size in the horizontal direction, which is non-preferable. In contrast, the configuration of the present embodiment enables downsizing of the image reading apparatus 300.

Although three cooling fans 321 to 323 are arranged in the vertical direction in FIG. 1, a plurality of cooling fans may be arranged in the horizontal direction (direction from front to back in FIG. 1) in a case where the horizontal width of the continuous print medium 11 is large. For example, a total of nine cooling fans, that is, 3 (vertical)×3 (horizontal) cooling fans, may be provided.

In the conveyance path of the continuous print medium 11, the roller 301 disposed in an area between the position where the continuous print medium 11 enters the image reading apparatus 300 and the cooling unit 320 that cools the continuous print medium 11 is disposed so as to be in contact with the back surface of the continuous print medium 11, that is, the surface opposite to the surface on which the image is formed. As described with reference to FIG. 2, the roller 205 disposed on the downstream side with respect to the fixing unit 230 in the image forming apparatus 200 is also disposed so as to be in contact with the back surface of the continuous print medium 11.

With this configuration, the image forming surface does not come into contact with any roller or the like until the continuous print medium 11 heated by the fixing unit 230 of the image forming apparatus 200 is cooled by the cooling unit 320. Therefore, it is possible to prevent disturbance of the toner image due to contact between the high-temperature image formed on the continuous print medium 11 and rollers, which can contribute to increasing a quality of the printed image.

The continuous print medium 11 cooled by the cooling unit 320 is conveyed upward by two rollers 302 and 303, passes through the rollers 304 and 305, and is conveyed horizontally in an upper part of the image reading apparatus 300. The scanner unit 330 is disposed so as to be in close contact with the front surface of the horizontally conveyed continuous print medium 11.

The scanner unit 330 is one of readers included in the image reading apparatus 300.

In the scanner unit 330 illustrated in FIG. 1, image light incident into the unit from a sheet proximity surface 331 is reflected by a plurality of mirrors 332 to 336, then passes through an optical system 337, and forms an image on an image sensor 338. Then, the image sensor 338 reads the image recorded on the continuous print medium 11. The image sensor 338 can be, for example, a charge coupled device (CCD) type line sensor. Alternatively, the image sensor 338 may be a complementary metal oxide semiconductor (CMOS) sensor. An image sensor other than a line sensor may also be used.

The data of the image read by the scanner unit 330 is supplied to an image inspection processor (not illustrated), and inspection processing is performed to determine whether or not the image formed by the image forming apparatus 200 is the same as the image of an original document.

Note that, when an image is formed on the image sensor 338 in a state where there is a certain optical path length in the scanner unit 330 as illustrated in FIG. 1, a region where an image can be correctly formed on the image sensor 338 can be increased. Therefore, according to the configuration illustrated in FIG. 1, the image formed on the front surface of the continuous print medium 11 can be correctly read by the image sensor 338.

The scanner backing part 340 is disposed on the side opposite to the sheet proximity surface 331 of the scanner unit 330 across the continuous print medium 11. The configuration of the scanner backing part 340 will be described later.

The scanner backing part 340 is attached to a roller holding member 381. The roller holding member 381 holds the two rollers 305 and 306 disposed on the upstream side and the downstream side on the scanner unit 330. The roller holding member 381 is connected to two legs 384 and 385 which can pivot on pivot points 382 and 383. The conveyance path of the continuous print medium 11 can be separated from the scanner unit 330 by pivoting the legs 384 and 385 along guide grooves 386 and 387 which are circularly curved.

When the conveyance path of the continuous print medium 11 is separated from the scanner unit 330 by the movement of the roller holding member 381, the scanner backing part 340 attached to the roller holding member 381 also moves in conjunction therewith.

Further, the shading unit 350 is disposed beside the roller holding member 381 (left side in FIG. 1). The shading unit 350 can be moved in the horizontal direction (left-right direction in FIG. 1) by being driven by a movement unit 352. Then, the shading unit 350 can be moved to a position directly below the scanner unit 330 in a state where the roller holding member 381 is moved away from the scanner unit 330.

The continuous print medium 11 that has passed through the scanner unit 330 is vertically conveyed downward by the roller 306 and is again conveyed in the horizontal direction by the roller 308.

The colorimeter unit 360 is disposed close to the front surface (upper surface) of the continuous print medium 11 that is horizontally conveyed by the roller 308.

The colorimeter unit 360 is one of the readers included in the image reading apparatus 300.

The colorimeter unit 360 includes a colorimeter therein and performs a color measurement process of measuring a color of a specific portion of the continuous print medium 11. For example, the color of the image read by the scanner unit 330 is calibrated on the basis of the color measurement result of the colorimeter.

The colorimeter backing part 370 is disposed on the side opposite to a sheet proximity surface 361 of the colorimeter unit 360 across the continuous print medium 11. The configuration of the colorimeter backing part 370 will be described later.

The continuous print medium 11 that has passed through the colorimeter unit 360 is conveyed to the outside of the image reading apparatus 300 via the rollers 309 and 310 and wound as a winding roll (not illustrated).

[Configurations of Scanner Backing Part and Colorimeter Backing Part]

Figure 3:
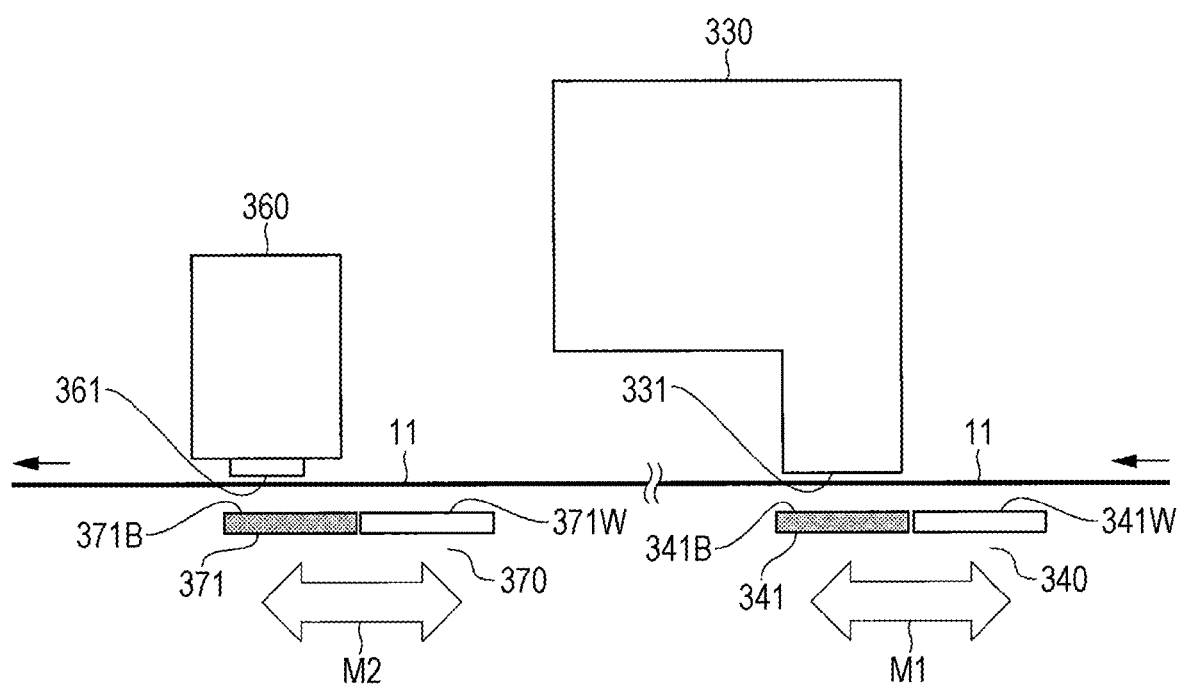
FIG. 3 is a diagram illustrating an operation example of a backing part according to the embodiment of the present invention.

FIG. 3 illustrates configurations of the scanner backing part 340 facing the scanner unit 330 and the colorimeter backing part 370 facing the colorimeter unit 360.

FIG. 3 is a side view of the scanner backing part 340 and the colorimeter backing part 370 in a state where the continuous print medium 11 is conveyed from right to left. In FIG. 3, the upper surface of the continuous print medium 11 is the front surface on which the image is formed by the image forming apparatus 200.

The scanner backing part 340 includes a backing member 341. The backing member 341 faces the sheet proximity surface 331 of the scanner unit 330 across the continuous print medium 11.

The backing member 341 has a black portion 341B in which the entire surface is black and a white portion 341W in which the entire surface is white, the black portion 341B and the white portion 341W being adjacent to each other. The backing member 341 is moved in a horizontal direction M1 by a drive mechanism (not shown) for switching between a state where the black portion 341B is located directly below the sheet proximity surface 331 and a state where the white portion 341W is located directly below the sheet proximity surface 331.

The colorimeter backing part 370 includes a backing member 371. The backing member 371 faces the sheet proximity surface 361 of the colorimeter unit 360 across the continuous print medium 11.

Similar to the backing member 341, the backing member 371 has a black portion 371B in which the entire surface is black and a white portion 371W in which the entire surface is white, the black portion 371B and the white portion 371W being adjacent to each other. The backing member 371 is moved in a horizontal direction M2 by a drive mechanism (not shown) for switching between a state where the black portion 371B is located directly below the sheet proximity surface 361 and a state where the white portion 371W is located directly below the sheet proximity surface 361.

Which one of the portions of each of the backing members 341 and 371 is selected as the color portion positioned directly below the corresponding one of the sheet proximity surfaces 331 and 361 as a background color is set according to the color and type of the continuous print medium 11 mounted on the image forming apparatus 200 and the color of an image formed by the image forming apparatus 200. The setting of the backing members 341 and 371 is executed by an instruction from a control unit (not illustrated) of the image forming apparatus 200, for example.

[Example of Setting Colors of Scanner Backing Part and Colorimeter Backing Part]

Figure 4:
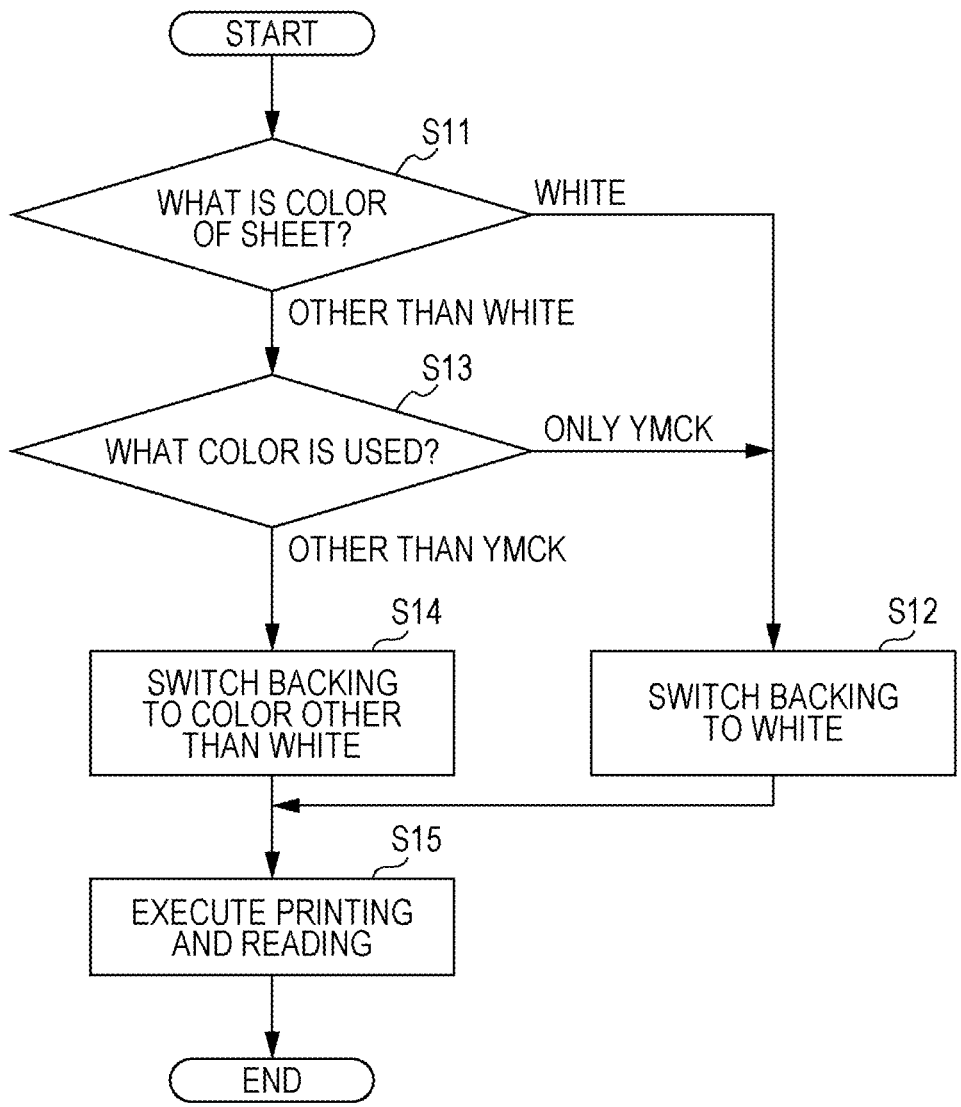
FIG. 4 is a flowchart illustrating a control example according to the embodiment of the present invention.

FIG. 4 is a flowchart illustrating an example of a process of setting a background color of the scanner backing part 340 and the colorimeter backing part 370.

First, the control unit of the image forming apparatus 200 determines whether the continuous print medium 11 mounted on the image forming apparatus 200 or the image reading apparatus 300 is a white print medium or a print medium with a color other than white (step S11). The color of the mounted continuous print medium 11 is set in advance by a printing operator on an operation panel of the image forming apparatus. Note that the print medium with a color other than white here includes a transparent or semitransparent film in addition to sheets and films of various colors.

When it is determined in step S11 that the continuous print medium 11 is white ("white" in step S11), the control unit of the image forming apparatus 200 gives an instruction to cause the backing parts 340 and 370 to switch in conjunction with each other so that the white portions 341W and 371W are positioned directly below the sheet proximity surfaces 331 and 361 (step S12).

When it is determined in step S11 that the continuous print medium 11 is not white ("other than white" in step S11), the control unit of the image forming apparatus 200 determines whether or not the color of toner (or the color of ink) used for forming an image by the toner image forming unit 210 is only yellow Y, magenta M, cyan C, and black K (step S13).

When the color of the toner for forming the image is only yellow Y, magenta M, cyan C, and black K in step S13 ("YMCK only" in step S13), the control unit of the image forming apparatus 200 proceeds to step S12 and gives an instruction to switch so that the white portions 341W and 371W are positioned directly below the sheet proximity surfaces 331 and 361.

When the toner for forming the image has a color other than yellow Y, magenta M, cyan C, and black K in step S13 ("other than YMCK" in step S13), the control unit of the image forming apparatus 200 gives an instruction to cause the backing parts 340 and 370 to switch in conjunction with each other so that the black portions 341B and 371B are positioned directly below the sheet proximity surfaces 331 and 361 (step S14). As a color other than yellow Y, magenta M, cyan C, and black K, a white color may be used to form an image, for example. The formation of an image with white includes a process called white underlay printing for forming, on a transparent film, an image in white as an underlay for forming an image of another color.

Then, in a state where the background colors of the scanner backing part 340 and the colorimeter backing part 370 are set in step S12 or S14, the image reading apparatus 300 reads the continuous print medium 11 on which the image is printed by the scanner unit 330 and the colorimeter unit 360 (step S15).

As described above, in the image reading apparatus 300 according to the present embodiment, the backing members 341 and 371 are switched to white when the print medium on which an image is to be formed by the image forming apparatus 200 is white and when the print medium has a color other than white and only toners (inks) of yellow Y, magenta M, cyan C, and black K are used. Therefore, it is possible to appropriately perform, in a white background, reading of an image formed with various colors on the continuous print medium 11 which is white or transparent or which has a color other than white by the scanner unit 330 for inspecting the printed image and reading of the image by the colorimeter unit 360 for color inspection.

In addition, the backing members 341 and 371 are switched to black when the print medium on which an image is to be formed by the image forming apparatus 200 has a color other than white and toner (ink) of a color other than yellow Y, magenta M, cyan C, and black K is used. For example, when an image is formed on the continuous print medium 11 which is a transparent film with white toner or ink, each of the backing members 341 and 371 is switched to black. Therefore, it is possible to appropriately perform, in a black background that is not white, reading of an image formed with a white color or the like by the scanner unit 330 for inspecting the printed image and reading of the image by the colorimeter unit 360 for color inspection.

Thus, when the image reading apparatus 300 according to the present embodiment reads an image formed in white by performing white underlay printing on, for example, a transparent film, the back surfaces of the scanner unit 330 and the colorimeter unit 360 are also switched to black, whereby the state of the formed white image can be accurately read. Furthermore, when an image formed with toner or ink of a color other than white is read, the back surfaces are switched to white, and accurate reading similar to the conventional reading can be performed.

[Modification]

The above embodiment describes an example in which an image is formed on the long continuous print medium, and the print medium having the image formed thereon is read. On the other hand, the present invention may be applied to an image forming apparatus or an image reading apparatus that forms an image on a print medium such as a sheet or a film cut into a prescribed size and that reads the print medium on which the image is formed.

Further, in the embodiment described above, the present invention is applied to the image reading apparatus 300 that is connected to the image forming apparatus 200 and that reads an image formed by the image forming apparatus 200 as illustrated in FIG. 2. On the other hand, a print medium on which an image has already been formed by a separate image forming apparatus may be mounted on a standalone image reading apparatus for reading the image.

Further, the configuration of the image forming apparatus 200 for fixing a toner image onto a print medium using the fixing unit 230 as illustrated in FIG. 2 is also an example, and the present invention may be applied to an image forming apparatus of another type such as an inkjet type using ink.

In addition, in the image reading apparatus described in the above-described embodiment, the backing member 341 of the scanner backing part 340 and the backing member 371 of the colorimeter backing part 370 are switched to the same color in conjunction with each other. On the other hand, only one of the scanner backing part 340 and the colorimeter backing part 370 may be switched to a plurality of colors.

In addition, a combination of white and black is used as the color to be switched of the backing members 341 and 371. This combination of colors may be changed to a combination of other colors according to the color of the print medium read by the image reading apparatus 300 or the color of an image formed on the print medium. For example, the backing members 341 and 371 may have a combination of white and gray.

Furthermore, in the flowchart illustrated in FIG. 4, the colors of the scanner backing part 340 and the colorimeter backing part 370 are switched under two conditions, the color of the print medium and the color for forming an image. On the other hand, the color of the scanner backing part 340 or the colorimeter backing part 370 may be switched on the basis of only one of the colors of the print medium and the color for forming an image. For example, the color of the scanner backing part 340 or the colorimeter backing part 370 may be switched between a case where the color for forming an image is only yellow Y, magenta M, cyan C, and black K and a case where the color is white or the like other than the above-mentioned colors.

Furthermore, the configuration of the scanner unit 330 for reading an image illustrated in FIG. 1 is also an example, and the image may be read by a sensor having another configuration. For example, an image may be read by a scanner having a line sensor disposed on the sheet proximity surface 331 without using an optical system such as a lens.

According to an embodiment of the present invention, the background color when an image is read by the reader is switched to a color by which the image can be appropriately read, only by selecting the type of sheet to be used, whereby images on sheets of various colors, transparent films, and the like can be appropriately read.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:
a reader that reads an image formed on a print medium, the reader including:
an image sensor, and
a colorimeter; and
a backing member that is disposed at a position facing the reader and is configured to move such that a color of a portion of the backing member to be a background of the print medium upon reading by the reader is changeable to a plurality of colors according to a type of the print medium and/or a color read from the print medium;
wherein
a conveyance path that conveys the print medium is bent in the image reading apparatus in a vertical direction, and
the image sensor and the colorimeter are positioned at different positions in the vertical direction with respect to the conveyance path and positioned to overlap each other at least partially in the vertical direction.

2. The image reading apparatus according to claim 1, wherein
the reader further includes an image sensor that reads an image formed on the print medium.

3. The image reading apparatus according to claim 2, wherein
the backing part is also provided at each of an installation position of the image sensor and an installation position of the colorimeter.

4. The image reading apparatus according to claim 3, wherein
the backing member installed facing the image sensor and the backing member installed facing the colorimeter are switched to a same color in conjunction with each other.

5. The image reading apparatus according to claim 2, wherein
the image sensor is a line image sensor.

6. The image reading apparatus according to claim 1, wherein
the reader further includes an image sensor,
the print medium read by the reader is a medium of a color other than white, and
the backing member is set to a color other than white when the reader reads a portion of the print medium where a white image is formed.

7. The image reading apparatus according to claim 6, wherein
the medium of a color other than white is a transparent medium.

8. The image reading apparatus according to claim 1, wherein
the backing member is switchable between white and black.

9. The image reading apparatus according to claim 1, wherein the color is changed via linear motion of the backing member.

10. An image forming apparatus comprising:
a conveyance path that conveys a print medium,
an image former that is disposed at a first position in a middle of the conveyance path and forms an image on the print medium,
a reader that is disposed at a second position downstream of the first position in the middle of the conveyance path in a conveyance direction and reads the image formed on the print medium by the image former the reader including:
an image sensor, and
a colorimeter; and
a backing member that is disposed at a position facing the reader across the conveyance path and is configured to move such that a color of a portion of the backing member to be a background of the print medium upon reading by the reader is changeable to a plurality of colors according to a type of the print medium and/or a color read from the print medium;
wherein
the conveyance path is bent in the image forming apparatus in a vertical direction, and
the image sensor and the colorimeter are positioned at different positions in the vertical direction with respect to the conveyance path and positioned to overlap each other at least partially in the vertical direction.

11. The image forming apparatus according to claim 10, the color is changed via linear motion of the backing member.

* * * * *